(12) United States Patent
Gu et al.

(10) Patent No.: US 11,288,568 B2
(45) Date of Patent: Mar. 29, 2022

(54) REINFORCEMENT LEARNING USING ADVANTAGE ESTIMATES

(71) Applicant: Google LLC, Mountain View, CA (US)

(72) Inventors: Shixiang Gu, Cambridge (GB);
Timothy Paul Lillicrap, London (GB);
Ilya Sutskever, San Francisco, CA (US); Sergey Vladimir Levine, Berkeley, CA (US)

(73) Assignee: Google LLC, Mountain View, CA (US)

(*) Notice: Subject to any disclaimer, the term of this patent is extended or adjusted under 35 U.S.C. 154(b) by 765 days.

(21) Appl. No.: 15/429,088

(22) Filed: Feb. 9, 2017

(65) Prior Publication Data

US 2017/0228662 A1   Aug. 10, 2017

Related U.S. Application Data

(60) Provisional application No. 62/293,250, filed on Feb. 9, 2016.

(51) Int. Cl.
*G06N 3/04* (2006.01)
*G06N 3/08* (2006.01)

(52) U.S. Cl.
CPC ............ *G06N 3/0427* (2013.01); *G06N 3/08* (2013.01)

(58) Field of Classification Search
CPC .................. G06N 3/0472; G06N 3/088
See application file for complete search history.

(56) References Cited

U.S. PATENT DOCUMENTS 9,189,749 B2   11/2015   Estes
9,536,191 B1 *  1/2017   Arel .................. G06N 3/08
(Continued)

FOREIGN PATENT DOCUMENTS

CN   103282891   9/2013
CN   103473111   12/2013
(Continued)

OTHER PUBLICATIONS

Fonteneau et al., "Batch Mode Reinforcement Learning based on the Synthesis of Artificial Trajectories," Spring Science+Business Media New York 2012 (Year: 2012).*

(Continued)

*Primary Examiner* — Kakali Chaki
*Assistant Examiner* — Kevin L. Smith
(74) *Attorney, Agent, or Firm* — Fish & Richardson P.C.

(57) ABSTRACT

Methods, systems, and apparatus, including computer programs encoded on a computer storage medium, for computing Q values for actions to be performed by an agent interacting with an environment from a continuous action space of actions. In one aspect, a system includes a value subnetwork configured to receive an observation characterizing a current state of the environment and process the observation to generate a value estimate; a policy subnetwork configured to receive the observation and process the observation to generate an ideal point in the continuous action space; and a subsystem configured to receive a particular point in the continuous action space representing a particular action; generate an advantage estimate for the particular action; and generate a Q value for the particular action that is an estimate of an expected return resulting from the agent performing the particular action when the environment is in the current state.

15 Claims, 4 Drawing Sheets

(56) References Cited

U.S. PATENT DOCUMENTS

| | | | | |
|---|---|---|---|---|
| 2005/0245303 | A1* | 11/2005 | Graepel | G06N 3/08 463/1 |
| 2009/0098515 | A1* | 4/2009 | Das | G09B 19/18 434/107 |
| 2009/0099985 | A1 | 4/2009 | Tesauro et al. | |
| 2013/0185039 | A1 | 7/2013 | Tesauro et al. | |
| 2017/0213150 | A1* | 7/2017 | Arel | G06N 3/088 |

FOREIGN PATENT DOCUMENTS

| | | |
|---|---|---|
| CN | 105139072 | 12/2015 |
| EP | 2386987 | 9/2013 |
| JP | 2010-134907 | 6/2010 |

OTHER PUBLICATIONS

Fonteneau et al., "Simultaneous Perturbation Algorithms for Batch Off-Policy Search," (IEEE 2014) (Year: 2014).*
Kuai Yu, "Playing Othello by Deep Learning Neural Network," Final Year Project Detailed Intermediate Report (2013) (Year: 2013).*
Yang et al., "Control of Nonaffine Nonlinear Discrete-Time Systems using Reinforcement-Learning-Based Linearly Parametrized Neural Networks," IEEE (2008) (Year: 2008).*
Hausknecht et al., "Deep Reinforcement Learning in Parmeterized Action Space," ICLR2016 (Year: 2016).*
Parisotto et al., "Actor-Mimic Deep Multitask and Transfer Reinforcement Learning," ICLR2016 (Jan. 6, 2016) (Year: 2016).*
Hasselt et al., "Using Continuous Action Spaces to Solve Discrete Problems" IEEE (2009) (Year: 2009).*
Yegor Tkachenko, "Autonomous CRM Control via CLV Approximation with Deep Reinforcement Learning in Discrete and Continuous Action Space" Stanford University (2015) (Year: 2015).*
International Search Report and Written Opinion issued in international application no. PCT/US2017/017258, dated Jun. 19, 2017, 22 pages.
Lillicrap et al. "Continuous control with deep reinforcement learning," arXiv preprint arXiv1509.02791v4, Jan. 19, 2016, 14 pages.
Sutton. "Dyna, an integrated architecture for learning, planning, and reacting," SIGART Newsletter, Association for Computing Machinery, New York, NY, 2(4) Jul. 1, 1991, 4 pages.
Wang et al. "Dueling network architectures for deep reinforcement learning," arXiv preprint arXiv:1511.06581v2, Jan. 8, 2016, 16 pages.
Gu et al. "Continuous Deep Q-learning with Model-based Acceleration," arXiv preprint arXivl603.00748, Mar. 2, 2016, 13 pages.
Atkeson et al. "Locally weighted learning for control," Lazy learning, Springer Netherlands, 1997, 63 pages.
Baird III. "Advantage updating," No. WL-TR-93-1146. Wright Lab Wright-Patterson AFB, OH, Nov. 4, 1993, 47 pages.
De Buin et al. "The importance of experience replay database composition in deep reinforcement learning," Deep Reinforcement Learning Workshop, NIPS, 2015, 9 pages.
Deisenroth et al. "PILCO: A model-based and data-efficient approach to policy search," Proceedings of the 28$^{th}$ International Conference on machine learning, 2011, 8 pages.
Deisenroth et al. "A survey on policy search for robotics," Foundations and Trends® in Robotics 2.1-2, Aug. 30, 2013, 143 pages.
Fu et al. "One-shot learning of manipulation skills with online dynamics adaptation and neural etwork priors," arXiv preprint arXiv1509.06841v3, Aug. 11, 2016, 8 pages.
Hafner et al. "Reinforcement learning in feedback control," Machine learning 84.1, Jul. 1, 2011, 33 pages.
Harmon et al. "Multi-player residual advantage learning with general function approximation," Wright Laboratory, WL/AACF, Wright-Patterson Air Force Base, OH, 1996, 14 pages.
Hausknecht et al. "Deep reinforcement learning in parameterized action space," arXiv preprint arXiv 151L04143v4, Feb. 16, 2016, 12 pages.
Heess et al. "Learning continuous control policies by stochastic value gradients," Advances in Neural Information Processing Systems, 2015, 9 pages.
Kingma et al. "Adam: A method for stochastic optimization," arXiv preprint arXiv: 1412.6980v9 Jan. 30, 2017, 15 pages.
Kober et al. "Reinforcement learning in robotics: A survey," The International Journal of Robotics Rsearch 32(11), Sep. 2013, 74 pages.
Konda et al. "Actor-critic algorithms," NIPS. Vol. 13, Nov. 1999, 7 pages.
Langley. "Crafting papers on Machine Learning," Proceedings of the 17$^{th}$ International Conference on Machine Learning, vol. 34, 2000, 7 pages.
Levine et al. "Learning neural network policies with guided policy search under unknown dynamics," Advances in Neural Information Processing Systems, 2014, 9 pages.
Levine et al. "Guided policy search," ICML (3), 2013, 9 pages.
Levine et al. "End-to-end training of deep visuomotor policies," Journal of Machine Learning Research, 17(39), Jan. 1, 2016, 40 pages.
Li et al. "Iterative linear quadratic regulator design for nonlinear biological movement systems," Submitted to the 1$^{st}$ International Conference on Informatics in Control, Automation and Robotics, Aug. 2004, 8 pages.
Lillicrap et al. "Continuous control with deep reinforcement learning," arXiv preprint arXiv1509.02971v5, Feb. 29, 2016, 14 pages.
Mnih et al. "Human-level control through deep reinforcement learning," Nature 518.7540, Feb. 26, 2015, 13 pages.
Mnih et al. "Playing Atari with deep reinforcement learning," arXiv preprint arXiv1312.5602, Dec. 19, 2013, 9 pages.
Oh et al. "Action-conditional video prediction using deep networks in Atari games," Advances in Neural Information Processing Systems, 2015, 9 pages.
Peters et al. "Policy gradient methods for robotics," International Conference on Intelligent Robots and Systems, Oct. 2006, 7 pages.
Peters et al. "Relative entropy policy search," AAAI, Jul. 11, 2010, 6 pages.
Rawlik et al. "On stochastic optimal control and reinforcement learning by approximate inference," Proceedings of Robotics; Science and Systems VIII, Jul. 2012, 16 pages.
Schaul et al. "Prioritized experience replay," arXiv preprint arXiv:1511.05952v4, Feb. 25, 2016, 21 pages.
Schulman et al. "Trust region policy Optimization," International Conference on Machine Learning, Feb. 19, 2015, 9 pages.
Schulman et al. "High-dimensional continuous control using generalized advantage estimation," arXiv preprint arXivl506.02438v5, Sep. 9, 2016, 14 pages.
Silver et al. "Deterministic policy gradient algorithms," International Conference on Machine Learning, Jun. 21, 2014, 9 pages.
Sutton. "Integrated architectures for learning, planning, and reacting based on approximating dynamic programming," Proceedings of the 7th International Conference on Machine Learning, 1990, 9 pages.
Sutton et al. "Policy gradient methods for reinforcement learning with function approximation," NIPS (99), Nov. 29, 1999, 7 pages.
Tassa et al. "Synthesis and stabilization of complex behaviors through online trajectory optimization," International Conference on Intelligent Robots and Systems, Oct. 7, 2012, 8 pages.
Todorov et al. "Mujoco: A physics engine for model-based control," International Conference on Intelligent Robots and Systems, Oct. 7, 2012, 8 pages.
Wahlstrom et al. "From pixels to torques: Policy learning with deep dynamical models," arXiv preprint arXiv: 1502.02251v3, Jun. 18, 2015, 9 pages.
Wang et al. "Dueling network architectures for deep reinforcement learning," arXiv preprint arXiv:1511.06581v3, Apr. 5, 2016, 15 pages.
Walter el al. "Embed to control: A locally linear latent dynamics model for control from raw images," Advances in Neural Information Processing Systems, 2015, 9 pages.
JP Office Action in Japanese Appln No. 2018-560745, dated Oct. 15, 2019, 7 pages (with English translation).

(56) References Cited

OTHER PUBLICATIONS

JP Decision to Grant a Patent in Japanese Appln. No. 2018-560745, dated Feb. 3, 2020, 5 pages (with English translation).
EP Office Action in European Application No. 17714039.9, dated Aug. 21, 2020, 15 pages.
CN Office Action in Chinese Application No. 201780015574.8, dated May 25, 2021, 33 pages (with English translation).

* cited by examiner

REINFORCEMENT LEARNING USING ADVANTAGE ESTIMATES

CROSS REFERENCE TO RELATED APPLICATIONS

This application is a non-provisional of and claims priority to U.S. Provisional Patent Application No. 62/293,250, filed on Feb. 9, 2016, the entire contents of which are hereby incorporated by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in a system for selecting actions to be performed by an agent interacting with an environment from a continuous action space of actions, the system comprising: a value subnetwork configured to receive an observation characterizing a current state of the environment; and process the observation to generate a value estimate, the value estimate being an estimate of an expected return resulting from the environment being in the current state; a policy subnetwork configured to receive the observation, and process the observation to generate an ideal point in the continuous action space; and a subsystem configured to receive a particular point in the continuous action space representing a particular action; generate an advantage estimate for the particular action from a distance between the ideal point and the particular point; and generate a Q value for the particular action that is an estimate of an expected return resulting from the agent performing the particular action when the environment is in the current state by combining the advantage estimate and the value estimate.

Other embodiments of this aspect include corresponding methods comprising the operations performed by the system and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Implementations can include one or more of the following optional features, either alone or in combination. The agent may be a mechanical agent interacting with a real-world environment. The mechanical agent may be a robot configured to perform a task in an environment based upon the actions. Generating the advantage estimate may comprise: applying a function having state-dependent parameters to the distance. The system may further comprise: a function parameter subnetwork configured to: receive the observation; and process the observation to generate an output that defines values of the state-dependent parameters. The advantage estimate may satisfy:

$$A(x, u|\theta^A) = -\frac{1}{2}(u - \mu(x|\theta^\mu))^T P(x|\theta^P)(u - \mu(x|\theta^\mu))$$

where the first term is the transpose of the distance, P is a state-dependent parameter matrix that has entries defined by the state-dependent parameter values, and the third term is the distance. P may be a positive definite matrix, and wherein $P(x|\theta^P) = LL^T$, where L is a lower-triangular matrix having entries derived from the output of the function parameter subnetwork. The system may further comprise: a replay memory storing experience tuples used to train the policy subnetwork and the value subnetwork. The subsystem may be further configured to, during the training of the policy subnetwork and the value subnetwork: generate imagination rollouts, wherein each imagination rollout is a synthetic experience tuple; and add the generated imagination rollouts to the replay memory. Generating an imagination rollout may comprise: identifying a particular observation characterizing a state transitioned into by the environment in response to an action performed by the agent; selecting an action different from the action performed by the agent in response to the particular observation; processing the particular observation and the selected action using a state transition model to determine a next observation characterizing a next state that the environment would have transitioned into if the agent had performed the selection action in response to the particular observation; and generating a synthetic experience tuple that includes the particular observation, the selected action, and the next observation.

Another one innovative aspect of the subject matter described in this specification can be embodied in methods of training a policy subnetwork of a reinforcement learning system that is configured to compute Q values for actions to be performed by an agent interacting with an environment from a continuous action space of actions comprising: obtaining an experience tuple identifying a training observation characterizing a training state of the environment, an action performed by the agent in response to the training observation, a reward received as a result of the agent performing the action in response to the training observation, and a subsequent observation characterizing a subsequent state of the environment; processing the training observation using a value subnetwork to generate a first value estimate, the first value estimate being an estimate of an expected return resulting from the environment being in the training state; processing, using the policy subnetwork and in accordance with current values of the parameters of the policy subnetwork, the training observation to generate an ideal point in the continuous action space for the training observation; generating an advantage estimate for the training action from a distance between the ideal point and a particular point representing the training action; generating a Q value for the particular action by combining the advantage estimate and the value estimate; processing the subsequent observation using the value subnetwork to generate a new value estimate for the subsequent state, the new value estimate being an estimate of an expected return resulting from the environment being in the subsequent state; combining the reward and the new value estimate to generate a target Q value for the particular action; and determining an update to the current values of the parameters of the policy subnetwork using an error between the Q value for the particular action and the target Q value.

Other embodiments of this aspect include systems of one or more computers and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages. Reinforcement learning in the context of continuous spaces of actions can be performed using general model-free approaches. This reduces the amount of task-specific details and domain knowledge needed to effectively train reinforcement learning systems in the context of continuous spaces of actions. Experience data for training model-free reinforcement learning systems can be generated using synthetic experience tuples. The amount of training data available for training reinforcement learning systems can be increased without needing to expend resources to monitor interactions of the agent with the environment. Accuracy and efficiency of trained reinforcement learning systems can be improved by providing the reinforcement learning system with a subsystem that allows actions other than an optimal action to be selected by the currently trained system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that selects actions to be performed by a reinforcement learning agent interacting with an environment. In order for the agent to interact with the environment, the system receives data characterizing the current state of the environment and selects an action from a predetermined set of actions to be performed by the agent in response to the received data. Data characterizing a state of the environment will be referred to in this specification as an observation.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be actions that control inputs to control the simulated user or simulated vehicle.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be actions that control inputs to control the robot or the autonomous vehicle.

Figure 1:
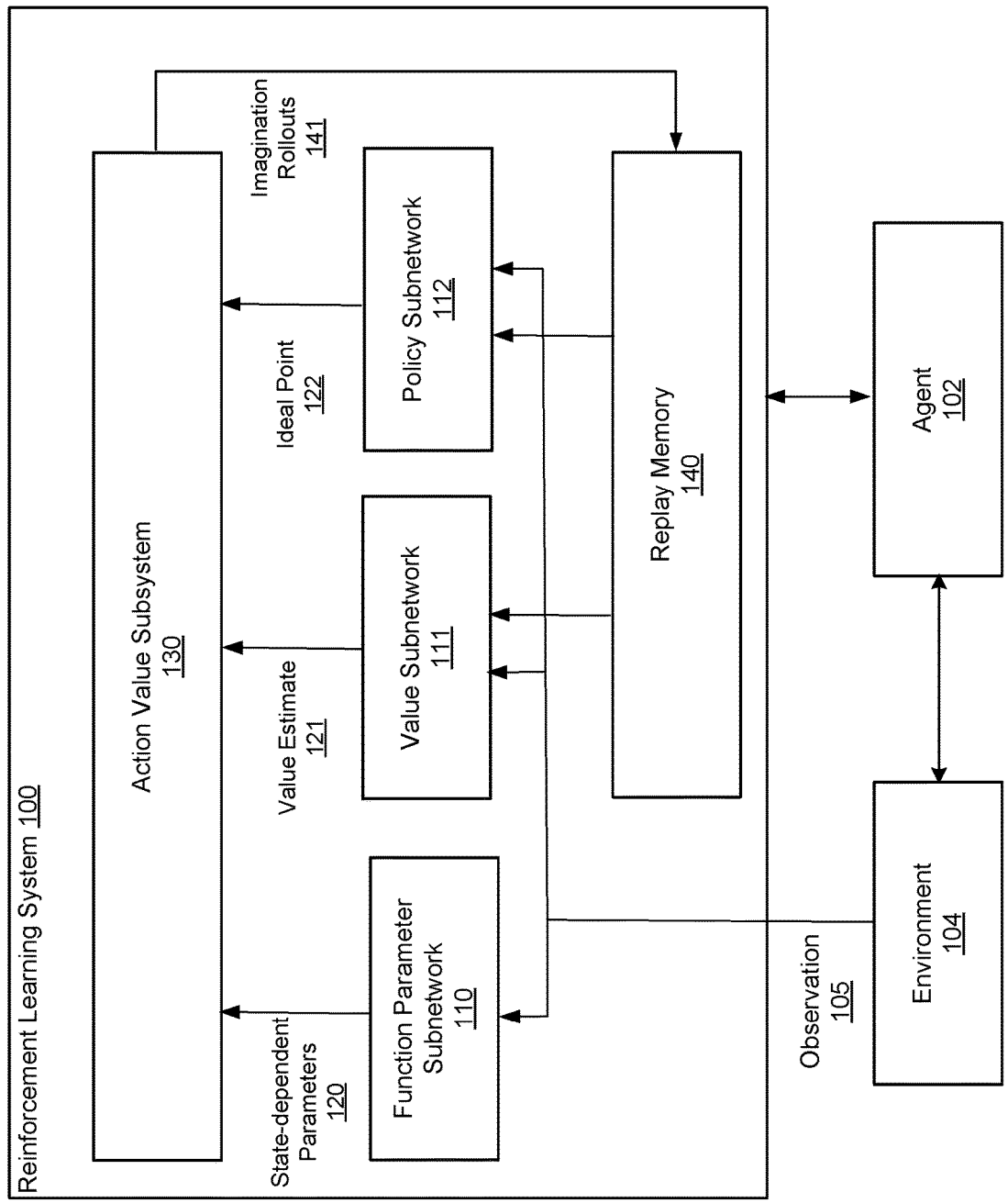
FIG. 1 shows an example reinforcement learning system.

FIG. 1 shows an example reinforcement learning system 100. The reinforcement learning system 100 is an example of a system implemented as computer programs on one or more computers in one or more locations, in which the systems, components, and techniques described below can be implemented.

The reinforcement learning system 100 selects actions to be performed by a reinforcement learning agent 102 interacting with an environment 104. That is, the reinforcement learning system 100 receives observations, with each observation characterizing a current state of the environment 104, and, in response to each observation, selects an action from a set of all possible actions to be performed by the reinforcement learning agent 102 in response to the observation. In response to some or all of the actions performed by the agent 102, the reinforcement learning system 100 receives a reward. Each reward is a numeric value received from the environment 104 as a consequence of the agent performing an action, i.e., the reward will be different depending on the state that the environment 104 transitions into as a result of the agent 102 performing the action.

The reinforcement learning system 100 selects actions to be performed by the agent 102 from a continuous space of actions. A continuous space of actions includes a set of all possible actions that lie on a continuous (i.e., uncountably infinite) domain. For instance, when the agent 102 is a robotic agent, the reinforcement learning system 100 may choose an action (e.g., represented by a vector with multiple control inputs) that includes setting a joint angle of an arm of the agent 102 to a particular value, where the particular value for the joint angle belongs to the continuous domain [0°, 360°]. Because the set of all possible actions lie on a continuous domain, the system 100 is selecting actions to be performed by the agent 102 from a continuous space of actions.

The reinforcement learning system 100 includes a value subnetwork 111, a policy subnetwork 112, and an action value subsystem 130. The reinforcement learning system 100 may also optionally include a function parameter subnetwork 110 and a replay memory 140.

The value subnetwork 111 is a neural network that is configured to receive the observation 105 and process the observation 105 to generate a value estimate 121 for the current state of the environment. The value estimate 121 is an estimate of an expected return resulting from the environment 104 being in the current state. In other words, the value estimate 152 measures the importance of being in the current state irrespective of the action selected when the environment 104 is in the current state. The expected return is the time-discounted total future reward resulting from the environment being in the state characterized by the observation, e.g., a time-discounted sum of future rewards received after the environment is in the state.

The policy subnetwork 112 is a neural network that is configured to receive the observation 105 and process the observation 105 to generate an ideal point 122 in the continuous space of actions. The ideal point 122 represents an action that, if performed in response to the observation, is expected to produce a maximum Q value of all actions in the continuous space. That is, the ideal point comprises output of the currently trained neural network indicating an optimal action given the current internal state of the neural network. A Q value for an action is the expected return resulting from the agent performing the action in response to the observation. The expected return is the time-discounted total future reward resulting from the agent performing the action in response to the observation, e.g., a time-discounted sum of future rewards received after the agent performs the action.

The function parameter subnetwork 110 is a neural network that is configured to receive the observation 105 and process the observation 105 to generate an output that defines values of state-dependent parameters 120 for the current state. In some implementations, the state-dependent parameters 120 explain one or more non-linear features of the current state. The action value subsystem 130 receives a particular point in the continuous space of actions representing a particular action, generates an advantage estimate for the particular action from the ideal point 122 and the state-dependent parameters 120, and generates a Q value for the particular action from the value estimate 121 and the advantage estimate. Generating Q values for a particular action is described in greater detail below with reference to FIG. 2.

As described above, the action value subsystem 130 determines the advantage estimate in such a way that the action having the highest Q value is always the action represented by the ideal point. Thus, after training the subnetworks, the reinforcement learning system 100 can select the action represented by the ideal point as the action performed by the actor. During the training of the subnetworks, the system can at times select an action other than the action represented by the ideal point to encourage exploration of the environment. For example, the reinforcement learning system 100 can select the action represented by the ideal point as the action to be performed by the agent with probability 1-ϵ and select a random action with probability ϵ. As another example, the system can sample a point from a noise distribution and then select an action that is represented by the point that is equal to (the sampled point+the ideal point).

In some implementations, the replay memory 140 stores experience tuples used to train the function parameter subnetwork 110, the value subnetwork 111, and the policy subnetwork 112. In those implementations, the reinforcement learning system 100 selects experience tuples from the replay memory 140 and uses the experience tuples to train the function parameter subnetwork 110, the value subnetwork 111, and the policy subnetwork 112.

By applying Q learning to problems with continuous spaces of actions, the reinforcement learning system 100 enables reinforcement learning in the context of such problems with a model-free approach. The reinforcement learning system 100 conducts model-free reinforcement learning when it learns about the environment 104 without using a model of state transition probability values and expected reward values associated with the environment 104. Such model-free approaches to reinforcement learning enable training policies for complex tasks with minimal feature and policy engineering, using raw state representation directly as input to a neural network system.

Generally, during training of a neural network that generates Q values using deep Q learning, it is necessary to determine a target output, i.e., a target Q value that should have been generated by the neural network, for a given action that was performed in response to a given observation. Conventionally, determining the target output includes identifying, from among all of the actions in the set of actions that can be performed by the agent, the action for which the neural network generates the maximum Q value when processed in combination with an observation characterizing the subsequent state resulting from the agent performing the given action (identifying the "argmax" of the actions). In continuous spaces of actions, the set of all possible actions in the subsequent state are uncountable. This often results in identifying the argmax being computationally infeasible or, at the least, very computationally intensive. To address this problem, the reinforcement learning system 100 can calculate the Q value for an action in response to a particular observation based on the value estimate of the particular state. In particular, as will be evident from the description of FIG. 2, because of the way the advantage estimates are determined, the advantage estimate for the argmax action is always zero and the reinforcement learning system can determine the target output using only the value estimate, which depends only on the observation and does not require processing multiple actions from the continuous action space. Thus, the reinforcement learning system can effectively train the function parameter subnetwork 110, the value subnetwork 111, and the policy subnetwork 112 using a deep Q learning technique even though the action space is continuous.

Some model-free approaches have the draw-back of requiring a high number of training examples for effective training. This training complexity of model-free approaches, particularly when using high-dimensional function approximators, i.e., deep neural networks that receive high dimensional data as input, tends to limit their applicability to physical systems. In some implementations, the reinforcement learning system 100 can address this training complexity by synthetically generating training data.

In some of the implementations in which the replay memory 140 stores experience tuples used to train the value subnetwork 111 and the policy subnetwork 112, the action value subsystem 130 generates imagination rollouts 141 and adds the generated imagination rollouts 141 to the replay memory 140. Imagination rollouts 141 are experience tuples that the reinforcement learning system 100 synthetically generates based on a state transition model of the environment 104.

Imagination rollouts 141 can provide the replay memory 140 with additional experience tuples to train the value subnetwork 111 and the policy subnetwork 112 without requiring direct exploratory actions by the agent 102. As such, the reinforcement learning system 100 can increase training data in the replay memory 104 without the need for real-world experimentation. This, in turn, can reduce the time of generating training data as well as the risk of damage to the agent 102 during real-world experimentation measures.

In some implementations, the reinforcement learning system 100 can train one or more of the value subnetwork 111, the policy subnetwork 112, the action value subsystem 130, and the function parameter subnetwork 110 by sampling from synthetic experience tuples generated from imagination rollouts 141 and actual experience tuples generated from real-world exploration by the agent 102 in accordance with a sampling policy. A sampling policy defines the frequency with which synthetic and actual experience tuples are each included in a sample of experience tuples from the replay memory 104.

Generating imagination rollouts 141 is described in greater detail below with reference to FIG. 3.

Figure 2:
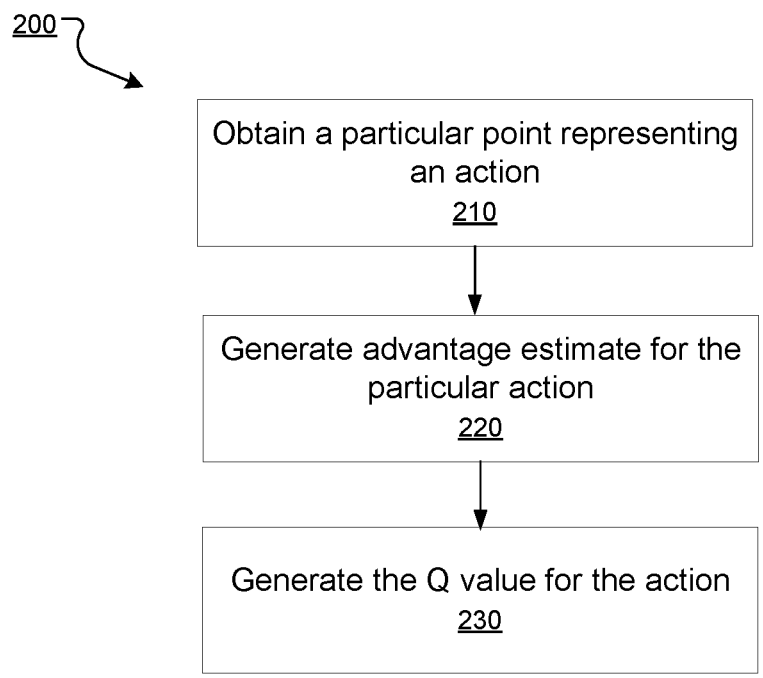
FIG. 2 is a flow chart an example process for generating Q values for actions.

FIG. 2 is a flow chart of an example process 200 for generating Q values for actions. For convenience, the process 200 will be described as being performed by a system of one or more computers located in one or more locations. For example, a reinforcing learning system, e.g., the reinforcing learning system 100 of FIG. 1, appropriately programmed in accordance with this specification, can perform the process 200.

The system obtains a particular point in a continuous space of actions that represents a particular action (210).

The system generates an advantage estimate for the particular action (220). In some implementations, the advantage estimate for the particular action in a current state is a measure of difference between the Q value for the particular action in the current state and the value estimate for the current state.

The system generates the advantage estimate from the distance between an ideal point in the continuous space of actions and the particular point in the continuous space of actions that represents the particular action.

In some implementations, the system applies a function having state-dependent parameters to the distance to generate the advantage estimate. In some of those implementations, the state dependent parameters are defined by the output of a function parameter subnetwork of the system (e.g., the function parameter subnetwork 110 of the reinforcement learning system 100 of FIG. 1).

In some of those implementations, the advantage estimate satisfies the following relationship:

$$A(x, u|\theta^A) = -\frac{1}{2}(u - \mu(x|\theta^\mu))^T P(x|\theta^P)(u - \mu(x|\theta^\mu))$$

where the function $A(x, u|\theta^A)$ produces the advantage estimate as its output, $(u-\mu(x|\theta^\mu))$ is the distance between the ideal point in the continuous action space and the particular point in the continuous action space representing the particular action, $(u-\mu(x|\theta^\mu))^T$ is the transpose of the distance, and $P(x|\theta^P)$ is a state-dependent parameter matrix that has entries defined by the state-dependent parameter values.

In some implementations, P is a positive definite matrix, and $P(x|\theta^P)=LL^T$, where L is a lower-triangular matrix having entries derived from the output of the function parameter subnetwork. That is, the state dependent parameters are each values of a respective entry of L at or below the main diagonal of L.

The system generates the Q values for the particular action (230) by combining the advantage estimate for the particular action and the value estimate of the current state. In some implementations, the system adds the advantage estimate for a particular action and the value estimate for a particular state to generate the Q value for the particular action in the particular state.

Figure 3:
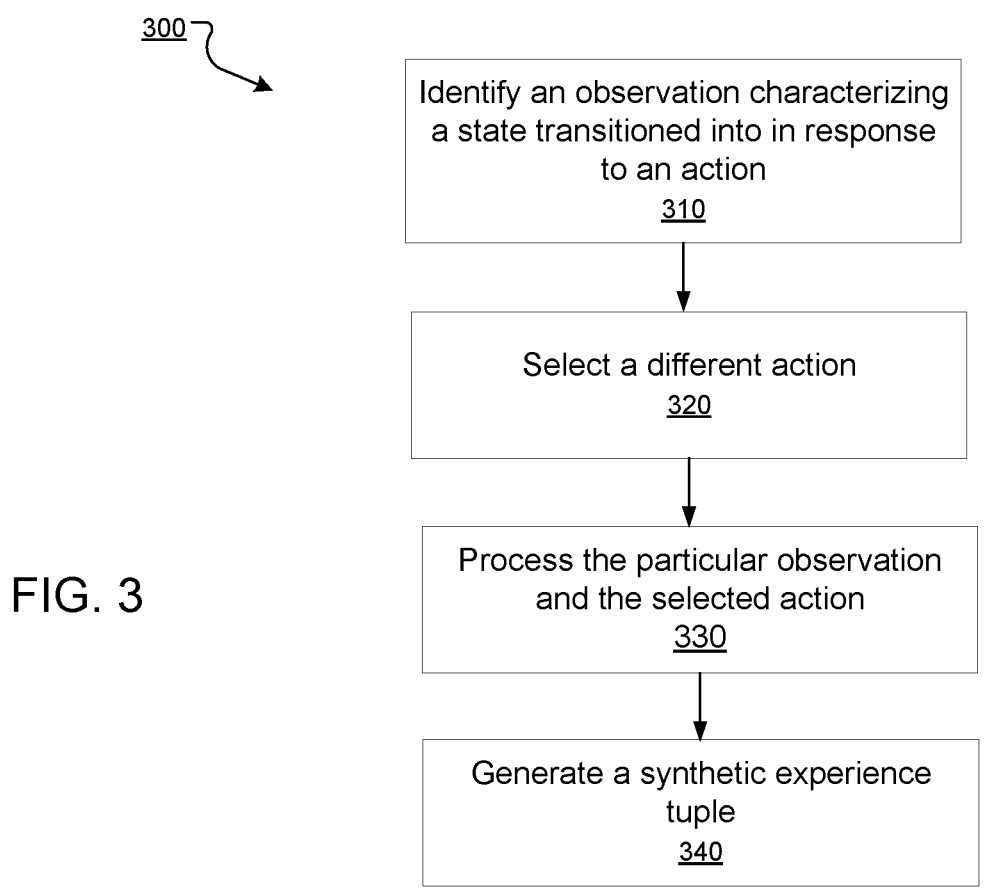
FIG. 3 is a flow chart of an example process for generating imagination rollouts.

FIG. 3 is a flow chart of an example process 300 for generating imagination rollouts. For convenience, the process 300 will be described as being performed by a system of one or more computers located in one or more locations. For example, a reinforcing learning system, e.g., the reinforcing learning system 100 of FIG. 1, appropriately programmed in accordance with this specification, can perform the process 300.

The system identifies a particular observation (310). The particular observation characterizes a state transitioned into by the environment in response to an action performed by the agent.

In some implementations, the system obtains the particular observation from a replay memory (e.g., the replay memory 140 of the reinforcement learning system 100 of FIG. 1).

The system selects an action different from the action performed by the agent in response to the particular observation (320).

In some implementations, the system randomly selects an action that is different from the action performed by the agent in response to the particular observation.

In some implementations, the system uses a predetermined strategy to select an action that is different from the action performed by the agent in response to the particular observation. For instance, the system selects an action having the lowest Q value in the state characterized by the particular observation.

In some implementations, the system selects an action based on one or more planned action trajectories for the agent. For instance, the system may select an action based on a trajectory planning algorithm, such as the iterative linear quadratic Gaussian (iLGQ) algorithm.

The system processes the particular observation and the selected action using a state transition model (330) to determine a next observation characterizing a next state that the environment would have transitioned into if the agent had performed the selection action in response to the particular observation. In other words, the system uses the state transition model to create an imaginary trajectory for the agent.

In some implementations, the system obtains the state transition model using a model learning algorithm. For instance, the system obtains the state transition model using a model learning algorithm that generates iteratively refitted time-varying linear models. In some of those algorithms, instead of learning a good global state transition model for all states and actions, the system aims only to obtain a good local model around the latest set of samples. Other model learning algorithms used by the system may generate a proposed state transition model as one or more of a neural network, a Gaussian process, and a locally weighed regression model.

Example model learning algorithms can be found in Heess, Nicolas, Wayne, Gregory, Silver, David, Lillicrap, Tim, Erez, Tom, and Tassa, Yuval. "Learning continuous control policies by stochastic value gradients" in Advances in Neural Information Processing Systems (NIPS), pp. 2926-2934, 2015; Deisenroth, Marc and Rasmussen, Carl E. "Pilco: A model-based and data-efficient approach to policy search," in International Conference on Machine Learning (ICML), pp. 465-472, 2011; Atkeson, Christopher G, Moore, Andrew W, and Schaal, Stefan. "Locally weighted learning for control," in Lazy Learning, pp. 75-113. Springer, 1997; and Levine, Sergey and Abbeel, Pieter. "Learning neural network policies with guided policy search under unknown dynamics," in Advances in Neural Information Processing Systems (NIPS), pp. 1071-1079, 2014.

The system generates a synthetic experience tuple (340) that includes the particular observation, the selected action, and the next observation. The synthetic experience tuple is the imagination rollout that the system can add to the replay memory.

In some implementations, the system performs steps 320 and 330 for multiple iterations to generate multiple synthetic experience tuples from a single sampled observation. For instance, after once performing steps 320 to determine an alternative action in response to a particular observation and step 330 to determine a next observation, the system performs step 320 to determine an alternative action in response to the new observation and step 330 to determine a new next observation. As such, the system can perform steps 320 and 330 iteratively to generate synthetic experience tuples until the environment of the agent reaches a designated terminal state.

For instance, the system can generate multiple synthetic experience tuples from the sampled observation by changing the alternative action taken in response to the observation.

Figure 4:
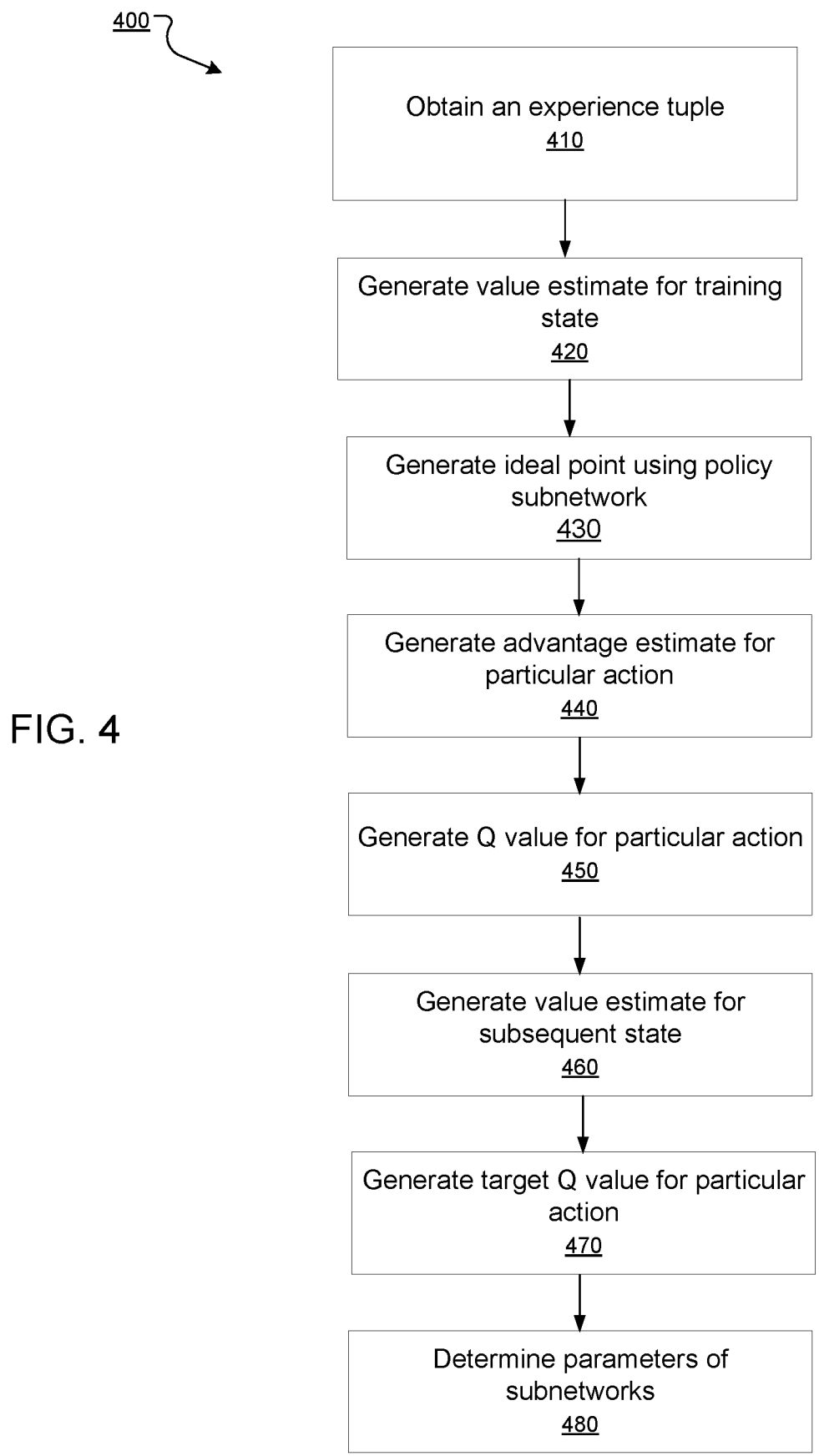
FIG. 4 is a flow chart of an example process for training a policy subnetwork.

FIG. 4 is a flow chart of an example process 200 for training subnetworks of a reinforcement learning system. For convenience, the process 400 will be described as being performed by a system of one or more computers located in one or more locations. For example, a reinforcing learning system, e.g., the reinforcing learning system 100 of FIG. 1, appropriately programmed in accordance with this specification, can perform the process 400.

The system obtains an experience tuple (410). The experience tuple includes (1) a training observation that characterizes a training state of the environment, (2) an action performed by the agent in response to the training observation, (3) a reward received as a result of the agent performing the action in response to the training observation, and (4) a subsequent observation characterizing a subsequent state of the environment.

The system processes the training observation using a value subnetwork to generate a first value estimate in accordance with current values of the parameters of the value subnetwork (420). The first value estimate is an estimate of an expected return resulting from the environment being in the training state.

The system processes the training observation to generate an ideal point in the continuous space of action for the training observation using the policy subnetwork and in accordance with current values of the parameters of the policy subnetwork (430). In other words, the system uses the policy subnetwork to generate an ideal point for the training state of the environment during the training observation.

The system generates an advantage estimate for the training action from a distance between the ideal point and a particular point representing the training action (440) and generates a Q value for the particular action by combining the advantage estimate and the value estimate (450). Generating advantage estimates and Q values for actions is described in greater detail above with respect to FIG. 2.

The system processes the subsequent observation using the value subnetwork to generate a new value estimate for the subsequent state (460). The new value estimate for the new subsequent state is an estimate of an expected return resulting from the environment being in the subsequent state.

The system combines the reward and the new value estimate to generate a target Q value for the particular action (470). The system generates the target Q value without determining the action for which the neural network generates the maximum Q value when processed in combination with an observation characterizing the subsequent state resulting from the agent performing the given action.

The system determines an update to the current values of the parameters of subnetworks of the reinforcement learning system using an error between the Q value for the particular action and the target Q value (480). In some implementations, the system determines the update using a training algorithm that relies on backpropagation based on the gradient of the error function.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of training a policy neural network of a reinforcement learning system that is configured to select actions to be performed by an agent interacting with an environment from a set of actions that lie on a continuous domain, the method being performed on a computing system configured to receive training observations representative of the environment, the method comprising:

obtaining an experience tuple identifying i) a training observation characterizing a training state of the environment, ii) a training action performed by the agent in response to the training observation, iii) a reward received as a result of the agent performing the training action in response to the training observation, and iv) a subsequent observation characterizing a subsequent state of the environment; and training the policy neural network on training data comprising the experience tuple, the training comprising:

processing the training observation using a value neural network and in accordance with current values of parameters of the value neural network to generate a first value estimate, the first value estimate being an estimate of an expected return resulting from the environment being in the training state characterized by the training observation irrespective of which action is performed in response to the training observation;

providing the training observation as input to the policy neural network;

for the training observation, obtaining, as output from the policy neural network and generated in accordance with current values of the parameters of the policy neural network, an output action in the set of actions that lie on the continuous domain;

determining a distance in the continuous domain between i) the output action in the set of all possible actions that lie on the continuous domain that is obtained as output from the policy neural network by processing the training observation and ii) the training action that was performed by the agent in response to the training observation;

generating an advantage estimate for the training action that was performed by the agent in response to the training observation from the determined distance in the continuous domain between i) the output action in the set of actions that lie on the continuous domain that is obtained as output from the policy neural network by processing the training observation and ii) the training action that was performed by the agent in response to the training observation, comprising, processing, by a function parameter neural network of the reinforcement leaning system, the training observation to generate an output that defines values of a set of state-dependent parameters; and applying a function having the set of state-dependent parameters to the distance between the output action in the set of actions that lie on the continuous domain and the training action that was performed in response to the training observation, wherein the advantage estimate satisfies:

$$A(x, u|\theta^A) = -\frac{1}{2}(u - \mu(x|\theta^\mu))^T P(x|\theta^P)(u - \mu(x|\theta^\mu))$$

where $(u-\mu(x|\theta^\mu))^T$ is a transpose of the distance between the output action in the set of actions that lie on the continuous domain and the training action that was performed in response to the training observation P is a state-dependent parameter matrix that has entries defined by the values of the set of state-dependent parameters, and $(u-\mu(x|\theta^\mu))$ the distance between the output action in the set actions that lie on the continuous domain and the training action that was performed in response to the training observation; and generating a Q value for the training action performed in response to the training observation by combining the advantage estimate for the training action performed in response to the training observation and the first value estimate that is an estimate of an expected return resulting from the environment being in the training state characterized by the training observation irrespective of which action is performed in response to the training observation;

processing the subsequent observation using the value neural network to generate a new value estimate for the subsequent state, the new value estimate being an estimate of an expected return resulting from the environment being in the subsequent state;

combining the reward and the new value estimate to generate a target Q value for the training action;

determining an update to the current values of the parameters of the policy neural network and the current values of the parameters of the value neural network using an error between i) the Q value for the training action generated using the distance between the output action and the training action and ii) the target Q value; and after the training, providing the trained policy neural network for use in controlling a mechanical agent interacting with a real-world environment.

2. The method of claim 1, wherein the agent is the mechanical agent and the environment is the real-world environment.

3. The method of claim 1, wherein P is a positive definite matrix, and wherein $P(x|\theta^P)=LL^T$, where L is a lower-triangular matrix having entries derived from the output of the function parameter neural network.

4. The method of claim 1, further comprising:

generating imagination rollouts, wherein each imagination rollout is a synthetic experience tuple; and adding the generated imagination rollouts to a replay memory of the reinforcement learning system storing experience tuples used to train the policy neural network and the value neural network.

5. The method of claim 4, wherein generating an imagination rollout comprises:

identifying a particular observation characterizing a state transitioned into by the environment in response to an action performed by the agent;

selecting an action different from the action performed by the agent in response to the particular observation;

processing the particular observation and the selected action using a state transition model to determine a next observation characterizing a next state that the environment would have transitioned into if the agent had performed the selected action in response to the particular observation; and generating a synthetic experience tuple that includes the particular observation, the selected action, and the next observation.

6. A system comprising one or more computers and one or more storage devices storing instructions that are operable, when executed by the one or more computers, the system configured to cause the one or more computers to perform a method for training a policy neural network of a reinforcement learning system, wherein the policy neural network is configured to select actions to be performed by an agent interacting with an environment from a set of actions that lie on a continuous domain, the method comprising:

obtaining an experience tuple identifying i) a training observation characterizing a training state of the environment, ii) a training action performed by the agent in response to the training observation, iii) a reward received as a result of the agent performing the training action in response to the training observation, and iv) a subsequent observation characterizing a subsequent state of the environment;

training the value neural network on training data comprising the experience tuple, the training comprising:

processing the training observation using a value neural network and in accordance with current values of parameters of the value neural network to generate a first value estimate, the first value estimate being an estimate of an expected return resulting from the environment being in the training state characterized by the training observation irrespective of which action is performed in response to the training observations;

providing the training observation as input to the policy neural network;

for the training observation, obtaining, as output from the policy neural network and generated in accordance with current values of the parameters of the policy neural network, an output action in the set of actions that lie on the continuous domain;

determining a distance in the continuous domain between i) the output action in the set of actions that lie on the continuous domain that is obtained as output from the policy neural network by processing the training observation and ii) the training action that was performed by the agent in response to the training observation;

generating an advantage estimate for the training action that was performed by the agent in response to the training observation from the determined distance in the continuous domain between i) the output action in the set of actions that lie on the continuous domain that is obtained as output from the policy neural network by processing the training observation and ii) the training action that was performed by the agent in response to the training observation, comprising:

processing, by a function parameter neural network of the reinforcement learning system, the training observation to generate an output that defines values, of a set of state-dependent parameters; and applying a function having the set of state-dependent parameters to the distance between the output action in the set of actions that lie on the continuous domain and the training action that was performed in response to the training observation, wherein the advantage estimate satisfies:

$$A(x, u|\theta^A) = -\frac{1}{2}(u - \mu(x|\theta^\mu))^T P(x|\theta^P)(u - \mu(x|\theta^\mu))$$

where $(u-\mu(x|\theta^\mu))^T$ is a transpose of the distance between the output action in the set of actions that lie on the continuous domain and the training action that was performed in response to the training observation, P is a state-dependent parameter matrix that has entries defined by the values of the set of state-dependent parameters, and $(u-\mu(x|\theta^\mu))$ is the distance between the output action in the set of actions that lie on the continuous domain and the training action that was performed in response to the training observation; and generating a Q value for the training action performed in response to the training observation by combining the advantage estimate for the training action performed in response to the training observation and the first value estimate that is an estimate of an expected return resulting from the environment being in the training state characterized by the training observation irrespective of which action is performed in response to the training observation;

processing the subsequent observation using the value neural network to generate a new value estimate for the subsequent state, the new value estimate being an estimate of an expected return resulting from the environment being in the subsequent state;

combining the reward and the new value estimate to generate a target Q value for the training action;

determining an update to the current values of the parameters of the policy neural network and the current values of the parameters of the value neural network using an error between i) the Q value for the training action generated using the distance between the output action and the training action and ii) the target Q value; and after the training, providing the trained policy neural network for use in controlling a mechanical agent interacting with a real-world environment.

7. The system of claim 6, wherein P is a positive definite matrix, and wherein $P(x|\theta^P)=LL^T$, where L is a lower-triangular matrix having entries derived from the output of the function parameter neural network.

8. The system of claim 6, wherein the operations further comprise:

generating imagination rollouts, wherein each imagination rollout is a synthetic experience tuple; and adding the generated imagination rollouts to a replay memory of the reinforcement learning system storing experience tuples used to train the policy neural network and the value neural network.

9. One or more non-transitory computer storage media encoded with computer program instructions configured to be executed by a plurality of computers that when executed, perform a method for training a policy neural network of a reinforcement learning system, wherein the policy neural network is configured to select actions to be performed by an agent interacting with an environment from a set of actions that lie on a continuous domain, the plurality of computers configured to execute the method comprising steps of:

obtaining an experience tuple identifying i) a training observation characterizing a training state of the environment, ii) a training action performed by the agent in response to the training observation, iii) a reward received as a result of the agent performing the training action in response to the training observation, and iv) a subsequent observation characterizing a subsequent state of the environment;

training the policy neural network on training data comprising the experience tuple, the training comprising:

processing the training observation using a value neural network and in accordance with current values of parameters of the value neural network to generate a first value estimate, the first value estimate being an estimate of an expected return resulting from the environment being in the training state characterized by the training observation irrespective of which action is performed in response to the training observation;

providing the training observation as input to the policy neural network;

for the training observation, obtaining, as output from the policy neural network and generated in accordance with current values of the parameters of the policy neural network, an output action in the set of actions that lie on the continuous domain;

determining a distance in the continuous domain between i) the output action in the set of that lie on the continuous domain that is obtained as output from the policy neural network by processing the training observation and ii) the training action that was performed by the agent in response to the training observation;

generating an advantage estimate for the training action that was performed by the agent in response to the training observation from the determined distance in the continuous domain between i) the output action in the set of actions that lie on the continuous domain that is obtained as output from the policy neural network by processing the training observation and ii) the training action that was performed by the agent in response to the training observation, comprising:

processing, by a function parameter neural network of the reinforcement learning system, the training observation to generate an output that defines values of a set of state-dependent parameters; and applying a function having the set of state-dependent parameters to the distance between the output action in the set of actions that lie on the continuous domain and the training action that was performed in response to the training observation, wherein the advantage estimate satisfies, $$A(x, u|\theta^A) = -\frac{1}{2}(u - \mu(x|\theta^\mu))^T P(x|\theta^P)(u - \mu(x|\theta^\mu))$$

where $(u-\mu(x|\theta^\mu))^T$ is a transpose of the distance between the output action in the set of actions that lie on the continuous domain and the training action that was performed in response to the training observation, P is a state-dependent parameter matrix that has entries defined by the values of the set of state-dependent parameters, and $(u-\mu(x|\theta^\mu))$ the distance between the output action in the set of actions that lie on the continuous domain and the training action that was performed in response to the training, observation; and generating a Q value for the training action performed in response to the training observation by combining the advantage estimate for the training action performed in response to the training observation and the first value estimate that is an estimate of an expected return resulting from the environment being in the training state characterized by the training observation irrespective of which action is performed in response to the training observation;

processing the subsequent observation using the value neural network to generate a new value estimate for the subsequent state, the new value estimate being an estimate of an expected return resulting from the environment being in the subsequent state;

combining the reward and the new value estimate to generate a target Q value for the training action;

determining an update to the current values of the parameters of the policy neural network and the current values of the parameters of the value neural network using an error between i) the Q value for the training action generated using the distance between the output and the training action and ii) the target Q value; and after the training, providing the trained policy neural network for use in controlling a mechanical agent interacting with a real-world environment.

10. The non-transitory computer storage media of claim 9, wherein P is a positive definite matrix, and wherein $P(x|\theta^P))=LL^T$, where L is a lower-triangular matrix having entries derived from the output of the function parameter neural network.

11. The method of claim 1, wherein the advantage estimate for the training action that was performed by the agent in response to the training observation is an estimate of the expected return of performing the training action in the training state, relative to the first value estimate.

12. The method of claim 1, wherein upon receiving a new observation, the method further comprising:

processing the new observation using the policy neural network to generate a new output action that lies on the continuous domain;

selecting a new action to be performed by the agent using the output action;

receiving a new reward and a new observation that characterizes a new subsequent state of the environment that the environment transitioned into as a result of the agent performing the new action; and generating a new experience tuple that includes the new observation, the new action, the new reward, and the new subsequent observation.

13. The system of claim 8, wherein generating an imagination rollout comprises:

identifying a particular observation characterizing a state transitioned into by the environment in response to an action performed by the agent;

selecting an action different from the action performed by the agent in response to the particular observation;

processing the particular observation and the selected action using a state transition model to determine a next observation characterizing a next state that the environment would have transitioned into if the agent had performed the selected action in response to the particular observation; and generating a synthetic experience tuple that includes the particular observation, the selected action, and the next observation.

14. The system of claim 6, wherein upon receiving a new observation, the operations further comprise:

processing the new observation using the policy neural network to generate a new output action that lies on the continuous domain;

selecting a new action to be performed by the agent using the output action;

receiving a new reward and a new observation that characterizes a new subsequent state of the environment that the environment transitioned into as a result of the agent performing the new action; and generating a new experience tuple that includes the new observation, the new action, the new reward, and the new subsequent observation.

15. The system of claim 6, wherein the agent is the mechanical agent and the environment is the real-world environment.

\* \* \* \* \*